(12) United States Patent
Damour et al.

(10) Patent No.: US 7,743,093 B2
(45) Date of Patent: *Jun. 22, 2010

(54) MESSAGE BASED NETWORK CONFIGURATION OF DOMAIN NAME PURCHASE

(75) Inventors: Kevin T. Damour, Bellevue, WA (US); Lingan Satkunanathan, Kirkland, WA (US); Theodore H. Roberts, III, Sammamish, WA (US); Leszek Mazur, Bellevue, WA (US); Neil S. Fishman, Bothell, WA (US); Scott A. Manchester, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1066 days.

This patent is subject to a terminal disclaimer.

(21) Appl. No.: 10/985,177

(22) Filed: Nov. 10, 2004

(65) Prior Publication Data

US 2006/0101155 A1 May 11, 2006

(51) Int. Cl.
  *G06F 15/16* (2006.01)
(52) U.S. Cl. ............ 709/203; 709/200; 709/223; 705/26
(58) Field of Classification Search ........... 709/203, 709/218–219, 223, 200; 705/26
See application file for complete search history.

(56) References Cited

U.S. PATENT DOCUMENTS

| | | | |
|---|---|---|---|
| 5,634,011 A * | 5/1997 | Auerbach et al. ........ 709/242 |
| 5,790,548 A | 8/1998 | Sistanizadeh et al. | |
| 6,028,848 A | 2/2000 | Bhatia et al. | |
| 6,108,703 A | 8/2000 | Leighton et al. | |
| 6,154,738 A * | 11/2000 | Call ................ 707/4 |
| 6,338,082 B1 * | 1/2002 | Schneider ............ 709/203 |
| 6,418,467 B1 | 7/2002 | Schweitzer et al. | |
| 6,442,602 B1 | 8/2002 | Choudhry | |
| 6,769,031 B1 | 7/2004 | Bero | |
| 6,862,444 B2 * | 3/2005 | Karaoguz et al. ........ 455/408 |
| 6,876,667 B1 * | 4/2005 | Synnestvedt et al. ...... 370/466 |
| 7,188,179 B1 | 3/2007 | Hanson et al. | |
| 7,194,552 B1 | 3/2007 | Schneider | |
| 2002/0029275 A1 | 3/2002 | Selgas et al. | |
| 2003/0041091 A1 | 2/2003 | Cheline et al. | |
| 2003/0145227 A1 | 7/2003 | Boden | |

(Continued)

OTHER PUBLICATIONS

U.S. Appl. No. 11/009,807, Theodore H. Roberts, III, et al.

(Continued)

*Primary Examiner*—Salad Abdullahi
*Assistant Examiner*—El Hadji M Sall
(74) *Attorney, Agent, or Firm*—Workman Nydegger

(57) ABSTRACT

Systems and methodologies that facilitate purchase and/or transfer of a domain name and access of users to the internet by using a well defined protocol to interact with a plurality of domain name registrars via employing a purchasing component and a mapping component. Once a user has identified a domain name, the purchasing component can automatically query the provider(s) for terms of the service plan to obtain such domain name. The mapping component can then point to a DNS provider designated to host such domain name, to manage in-bound traffic. The subject invention can also be implemented in web services based hosted solutions directory, for example by designation of a trusted on-line registry that registers a plurality of service providers to supply services to clients, with a secure communication between the clients and the trusted on-line registry for selection of a service provider.

20 Claims, 13 Drawing Sheets

U.S. PATENT DOCUMENTS

| | | | |
|---|---|---|---|
| 2003/0212660 | A1 | 11/2003 | Kerwin |
| 2004/0098375 | A1* | 5/2004 | DeCarlo, III ................... 707/3 |
| 2004/0172463 | A1* | 9/2004 | King et al. .................. 709/223 |
| 2005/0149454 | A1 | 7/2005 | Chen et al. |
| 2006/0015716 | A1 | 1/2006 | Thornton et al. |
| 2006/0031330 | A1* | 2/2006 | Ruiz .......................... 709/206 |
| 2006/0059346 | A1 | 3/2006 | Sherman et al. |
| 2006/0088026 | A1 | 4/2006 | Mazur et al. |
| 2006/0101155 | A1 | 5/2006 | Damour et al. |

OTHER PUBLICATIONS

U.S. Appl. No. 11/009,641, Lingan Satkunanathan, et al.
VeriSign, "VeriSign Web site—SSL Certificates," Certificates, Dec. 30, 2003, http://web.archive.org/web/20040708073501/verisign.com/products/site/index.html?sl=070302.
Entrust, Entrust Web site, Entrust Certificate Services—Screen Shot, Jul. 1, 2004. http://web.archive.org/web/20040619151540/www.entrust.com/certificate_services/web_pricing.htm.
OA dated Sep. 23, 2008 for U.S. Appl. No. 11/009,641, 23 pages.
OA dated Jan. 16, 2009 for U.S. Appl. No. 10/974,182, 33 pages.
WhichSSL, WhichSSL.com Website, "SSL Certificate Comparison - Screen Shot," Jun. 26, 2004, http://web.archive.org/web/20040626044120/www.whichssl.com/ssl-certificate-comparison.html.
Internet Key Exchange (IKE) Definition Last Updated May 29, 2007, http://searchsecurity.techtarget.com/sDefinition/0,,sid14_gci884946,00.html, 1 Page.
Office Action dated Apr. 28, 2008 cited in U.S. Appl. No. 11/009,641.
Office Action dated Feb. 12, 2009 cited in U.S. Appl. No. 11/009,641.
Office Action dated Aug. 11, 2009 cited in U.S. Appl. No. 11/009,641.
Office Action dated Sep. 14, 2009 cited in U.S. Appl. No. 10/974,182.
Office Action dated Nov. 17, 2005 cited in U.S. Appl. No. 11/009,807.
Office Action dated Apr. 6, 2006 cited in U.S. Appl. No. 11/009,807.
Office Action dated Oct. 23, 2006 cited in U.S. Appl. No. 11/009,807.
Office Action dated Apr. 23, 2007 cited in U.S. Appl. No. 11/009,807.
Office Action dated May 1, 2008 cited in U.S. Appl. No. 11/009,807.
Office Action dated Jan. 13, 2009 cited in U.S. Appl. No. 11/009,807.
Office Action dated Jul. 27, 2009 cited in U.S. Appl. No. 11/009,807.

* cited by examiner

MESSAGE BASED NETWORK CONFIGURATION OF DOMAIN NAME PURCHASE

TECHNICAL FIELD

The subject invention relates generally to purchase, set up and configuration of domain names, and more particularly to systems and methods that facilitate purchase, remote configuration and maintenance of domain names, via a structured messaging format and protocol.

BACKGROUND OF THE INVENTION

The rapid growth of the Internet and Internet based applications has created a multitude of benefits for businesses, such as ease of marketing and sales to clients. In such environments, to register and start using a domain name, a service of a domain name registrar is required. In general, the domain name industry is regulated and overseen by Internet Corporation for Assigned Names and Numbers (ICANN): a nonprofit organization that has assumed the responsibility for IP address space allocation, protocol parameter assignment, domain name system management and root server system management functions previously performed under U.S. Government contract.

A domain name can be hosted by a Domain Name Service (DNS) provider, which allows potential clients to key a URL (Uniform Resource Locator) or domain name into the address line of their browser and access a corresponding server of the business. In general, a Domain Name Service (DNS) includes distributed set of servers primarily used by internet applications to lookup the network address of a given internet server. For example, an internet application that requires to look up a server name initially can send a DNS query to a local Domain Name server (LDNS), which may be located at the same site. The LDNS can also maintain a cache of resource records, for example, mappings between server names and IP addresses. To facilitate mnemonic identification of destination computer systems, a Domain Name Service (DNS) can typically translate a unique textual name for a destination computer system into the IP address for that computer. The textual name is called a "domain name."

As such, the basic function of DNS is to provide a distributed database that maps between human-readable host names and IP addresses. The DNS name space can be hierarchically organized so that subdomains can be locally administered. The root of the hierarchy can be centrally administered and served from a collection of root servers. In addition, sub domains can be delegated to other servers that are authoritative for their portion of the name space, and such process can be repeated recursively.

An example of a domain name is "www.Microsoft.com", wherein, "www" indicates World-Wide Web, "Microsoft" indicates an example of a company name, .com indicates commercial (as opposed to .gov for government entities, .edu for education entities, .org for non-profit organizations, and the like). Likewise, progressing from right to left, the host name can be structured from general to very specific. For example, "com" can typically be referred to as a top-level domain name, "Microsoft" is sometimes referred to as a second-level domain name, and "www" can designate the server that handles Internet requests, and is sometimes referred to as a third-level domain name.

An example of a URL is "http://www.Microsoft.com/1.gif", where the "http://" indicates the type of resource and the last field, "1.gif", indicates a file name, but may also be a Web page, executable application, or other computer readable or executable file located at the URL that the user wishes to access.

When the user enters the URL into a browser, the browser can make a determination as to whether it knows a corresponding IP (Internet Protocol) address. For example, a corresponding IP address for "Microsoft.com" may be 207.46.130.108. The browser knows the corresponding IP address if that host name has been visited recently and the address is still in a short-term host name address table in the browser.

At the same time, generally, required steps for an internet presence includes purchasing a domain name, configuration of the DNS services, certification purchase procedures, and the like. Such numerous steps can typically include cumbersome procedures, such as manual configuration, which can be susceptible to errors. In addition, some users (e.g., small business owners) may be unfamiliar with such procedures and may require expert help that can be time consuming and increase users' set up costs.

For example, before a small business can initiate a presence electronically on the Internet and the World Wide Web, such a business is often required to purchase a domain name and register with a DNS provider to host such domain. To do so, a representative of the small business can be required to initiate communication (e.g., via telephone, fax, mail and the like) with a representative of the domain name registrar in order to establish an account therewith. During such communication, the domain name registrar representative is provided with general information (e.g., name, address, business type and the like) and a form of payment (e.g., a credit card number). In return, the registrar can supply the user with a username and password that can be employed to authenticate the user and authorize transfer/purchase of the domain name for a presence on the internet. Hence, the different presentation of the plan options offered by the various domain name registrars, as well as mapping such domain names to a DNS provider can be confusing to a user and require cumber some registration steps.

Moreover, each domain name registrar can require loading and implementing specialized proprietary software/procedures that can further complicate matters, and impede a user's ability to accurately compare plans offered by the domain name registrars, an the DNS providers. Such disparate configuration tools can thwart users from employing opportunities provided by the internet to their full potentials. For example, in order to map the domain name to a DNS provider, the provider or registrar can send, via a postal or other delivery service, proprietary software that may need to be installed on a computer system prior to purchase/transfer of the domain name and its hosting by the DNS provider. Any such associated software and/or hardware must be correctly installed on the computer system, in order for the user of small business to enjoy benefits of a domain name and thereby presence on the Internet. Thus, such a user is generally required to wait until such software and hardware is received. Thereafter, the user must correctly install the associated software and/or hardware at the computer system to enable Internet presence.

If correctly installed, a user can then configure inbound traffic, and interact with the DNS provider. In order to support secure web traffic, the user must also obtain proper certificate provisions via third parties for the domain name of the user. Obtaining such certificate can further add to the complexities of establishing presence on the internet.

Thus and as explained above, users wishing to enjoy presence of their domain names on the Internet can typically be subjected to: non-uniform presentations in a multi-vendor environment, cumbersome contacting requirements, waiting periods for appropriate access software and/or hardware to be delivered or installed.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for systems and methods that facilitate purchase of a domain name and mapping it to a host service by using a schema that operates between an end user machine and a domain name registrar, wherein the schema employs a purchasing component and a mapping component. The purchasing component can further include various sub components that characterize the domain name registrar's offered term of sale for the domain name, such as billing, plan selection, renewal, promotional calls, transfer options from business to business, availability of a domain name, and the like. The mapping component can provide for a pointing mechanism to point to a DNS server selected by the user for hosting the domain name purchased via the schema of the subject invention.

In a related aspect, if a desired domain name is not available, the schema of the subject invention can provide the domain name registrar with hints for suggesting additional names that are available for purchase. The hints can include clues relating to the nature of the business, trademark, location of the business and the like. Accordingly, the registrar is prompted to suggest additional domain names for display to a user. Such standard messages can provide a user with a uniform presentation of various domains names and respective plans offered by the plurality of the domain name registrars, wherein the user can then select a desired plan therefrom, and purchase a domain name. The standardized messages can be for example in a form of XML (Extensible Markup Language).

In accordance with a further aspect of the subject invention, a plurality of third party domain name registrars can enlist to receive a standardized set of messages, wherein a user can purchase a desired domain name(s) from these registrars, via a purchasing component of the message set. The purchasing component can further include a "domain info" component that provides a list of contact information to the domain name registrar. Such list can include for example, administrative contact, technical contact, contact in case of host server failure, and the like. Also, additional fields can be defined in the schema of the subject invention for authorization for a transfer of a domain name to another party.

The invention thus facilitates initial server configurations (e.g., presence of small businesses on the internet), and on-going maintenance, wherein employing multi-vendor components are simplified by using a unified and common message structure. Such unified and common message structure can be used by a plurality of end user networked devices such as stand alone routers, window servers, and the like when interacting with third party domain name registrars.

According to a methodology of the subject invention, once a user identifies a domain name, the purchasing component can automatically query the domain name registrar about availability of such domain name for purchase, and if available, the terms of service agreement to obtain such domain name. The terms can include; type of offered plan, price, terms of payments and the like. In addition, if no such name is available, a list of other related and/or similar domain names is presented to the user, in anticipation of a possible purchase.

Subsequently, a response can be received by the end user machine. A billing query can automatically then be prepared and submitted to the domain name registrar. Next, the domain name registrar can provide a billing response that outlines the service agreement terms for purchasing such domain name. The received response can then be displayed to a user, via a uniform presentation and graphical interface, such that a user enjoys a similar experience, regardless of which domain name registrar the user interacts with. Next, the user can elect a desired plan and purchase the selected domain name to initiate internet presence.

The subject invention can also be implemented as web services based hosted solutions directory, for example by designation of a trusted on-line registry that registers a plurality of service providers to supply services to clients, with a secure communication between the clients and the trusted on-line registry for selection of a service provider.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

Figure 1:
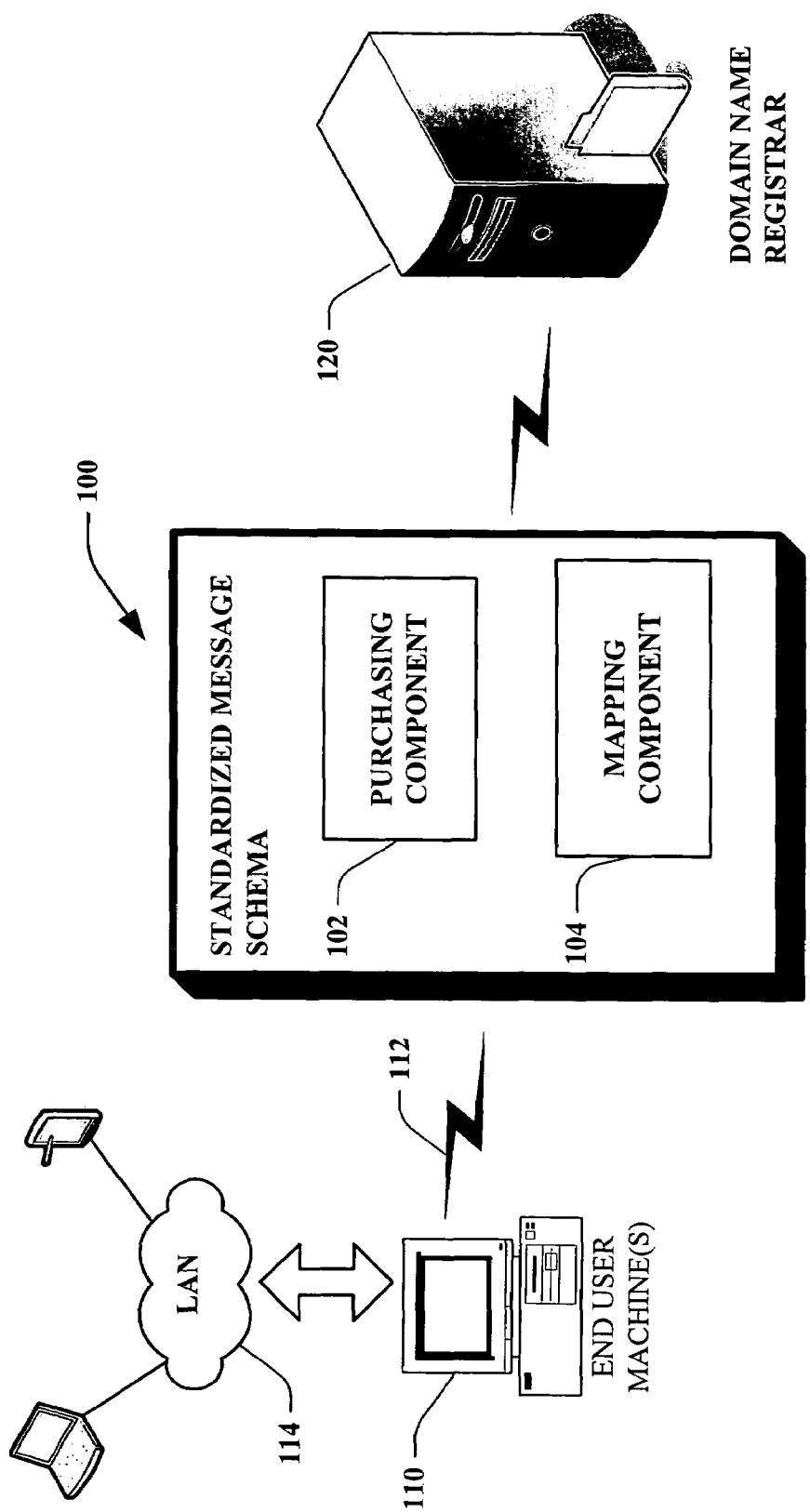
FIG. 1 illustrates a schematic block diagram of components associated with a messaging schema exchanged between an end user machine and a domain name registrar, to purchase a domain name in accordance with an aspect of the subject invention.

Appendix A presented infra provides one particular exemplary set of schema in accordance with an aspect of the subject invention—this appendix is to be considered part of this specification describing the invention.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

The subject invention provides for a standardized messaging schema that facilitates purchase of a domain name and presence of users on the internet by using a well defined protocol to interact with a plurality of domain name registrars via employing a purchasing component and a mapping component. Such a messaging schema can further provide for a uniform presentation of various purchase plans offered by a domain name registrar(s), and thus a user can enjoys a similar experience, regardless of which domain name registrar the user interacts with.

Referring initially to FIG. 1, a block diagram of a messaging protocol 100 for interaction between an end user machine 110 and a domain name registrar 120 is illustrated. Such messaging protocol can include a purchasing component 102 and a mapping component 104, which are part of a standardized set of messages transferred between the domain name registrar(s) 120 and an end user device 110.

The end user machine 110 can be a personal computer, work stations personal digital assistant, and the like. In addition, the end user machine 110 can also be an Internet Connection Sharing Device (ICSD) that facilitates sharing a connection 112 from a network 114 to the Internet (not shown). As such, the end user machine 110 can be a computer executing a process that facilitates time-sharing or frequency sharing of the Internet connection 112, for example. The connection 112 can be, for example, a modem connection, a DSL connection and/or a wireless connection. The network 114 can be, for example, an Ethernet LAN, a token ring LAN, or other LAN. Although the invention is primarily described within the context of an end user machine 110 that communicates with a domain name registrar 120, it is to be appreciated that the network 114 can also include a Wide Area Network (WAN). Moreover, the network 114 can include hardwired and/or optical and/or wireless connection paths. The connection 112 can be shared among a plurality of devices connected to the network 114. Such devices can include, personal computers, workstations, televisions and telephones, for example. Sharing of the connection 112 facilitates reducing the cost of one or more of the LAN devices, and can reduce the complexity of managing the network 114 and optimizes the throughput of the connection 112.

Likewise, the domain name registrar 120 can provide access to a distributed Internet directory service (not shown), while providing a selection of domain names and mapping the purchased domain name by the user to a designated Domain Name Service (DNS) provider and/or server for controlling in bound traffic (e.g., Internet email delivery). Typically, it is the domain name registrar 120 that has the authority to grant a domain name and verify that the name has not been previously assigned to another user.

Once the domain name registrar 120 enlists to receive the standardized messages of the subject invention, a user can select such registrar to offer plans for purchase of the domain name identified by the user. Each plan can have a plurality of terms and conditions such as, billing, renewal, promotional calls, transfer options from business to business, price and the like associated therewith. Upon selection of a plan by the user, the domain name registrar can then map the domain name via the mapping component 104 of the standardized message schema, to a DNS server (not shown) at the back end.

Figure 2:
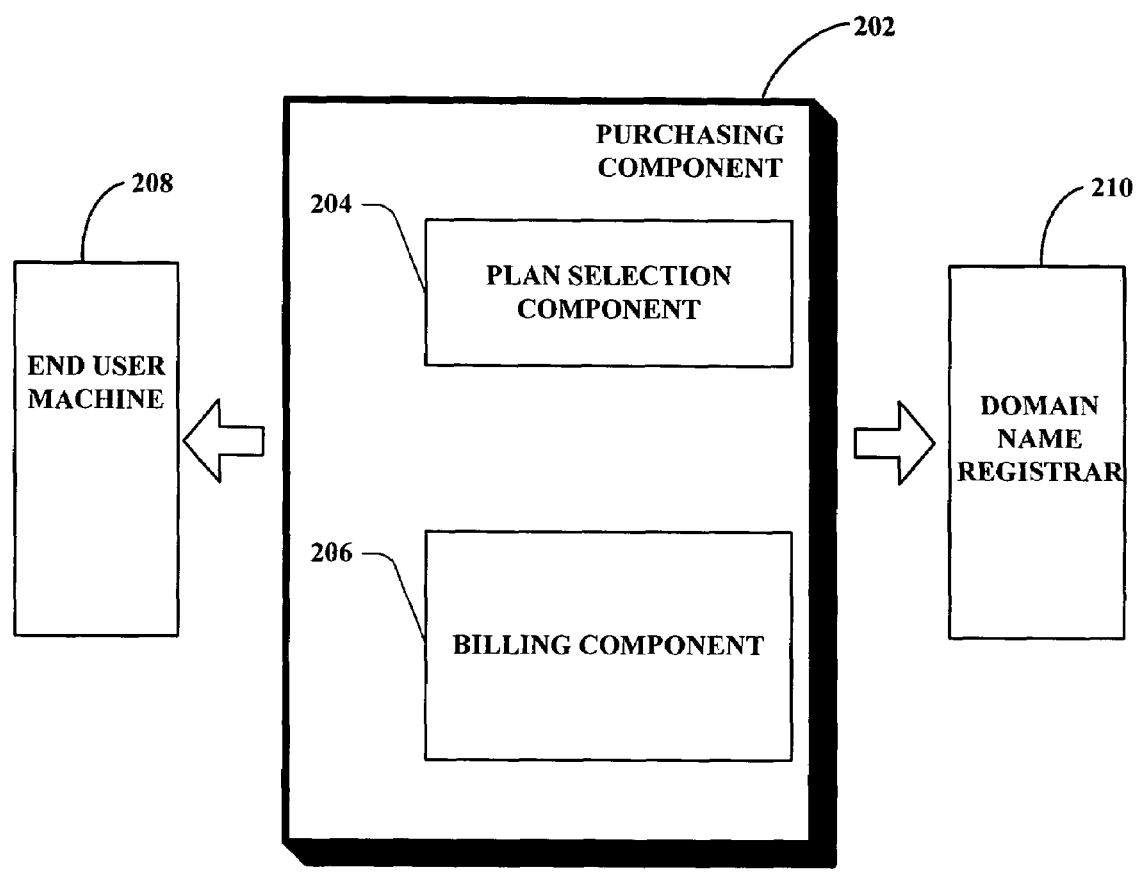
FIG. 2 illustrates a plurality of sub components associated with the purchasing component in accordance with an aspect of the subject invention.
Figure 3:
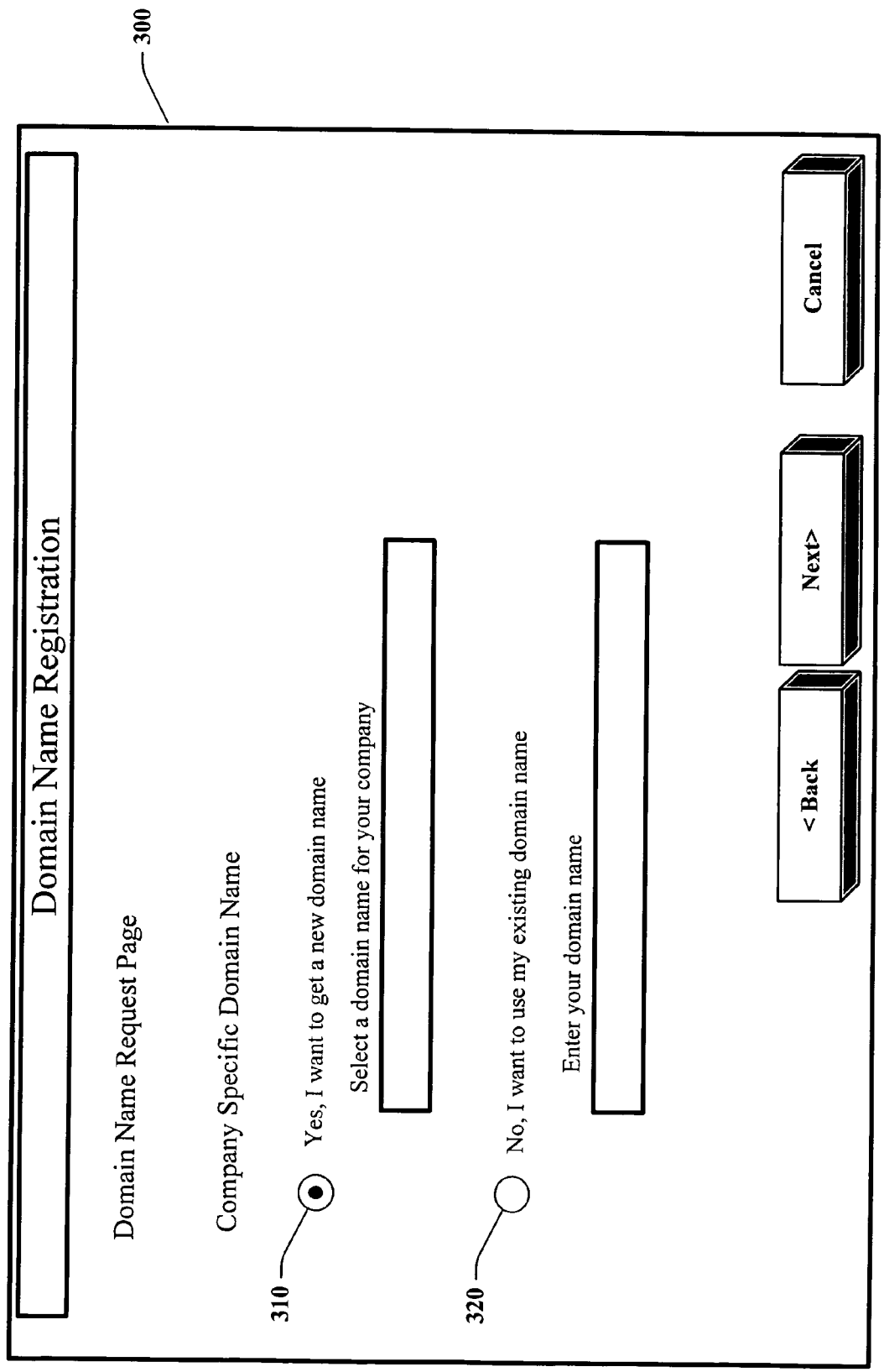
FIG. 3 illustrates a particular graphical uniform interface employed for presentation of a domain name request page in accordance with an aspect of the subject invention.

Referring now to FIG. 2 various sub components that can be associated with the purchasing component 202 is illustrated. Such purchasing component 202 can further include a plan selection component 204, and a billing component 206. The purchasing component 202 can query the domain name registrar 208 for a list of plan offerings and terms of the service agreement that are associated with the plan selection component 204. Such can include: the availability of the domain name, whether a transfer of the domain name is required from another business, identification of the top level domain name (TLD), renewal options, promotional calls and the like. FIG. 3 illustrates an exemplary graphical uniform interface 300 employed for a domain name request page in connection with establishing a user's presence on the internet. The user can specify a company specific domain name for receiving e-mail and/or hosing a web site that is accessible to the customers of the user. The user can be given a choice obtaining a new domain name 310 or using an existing domain name at 320.

Figure 4:
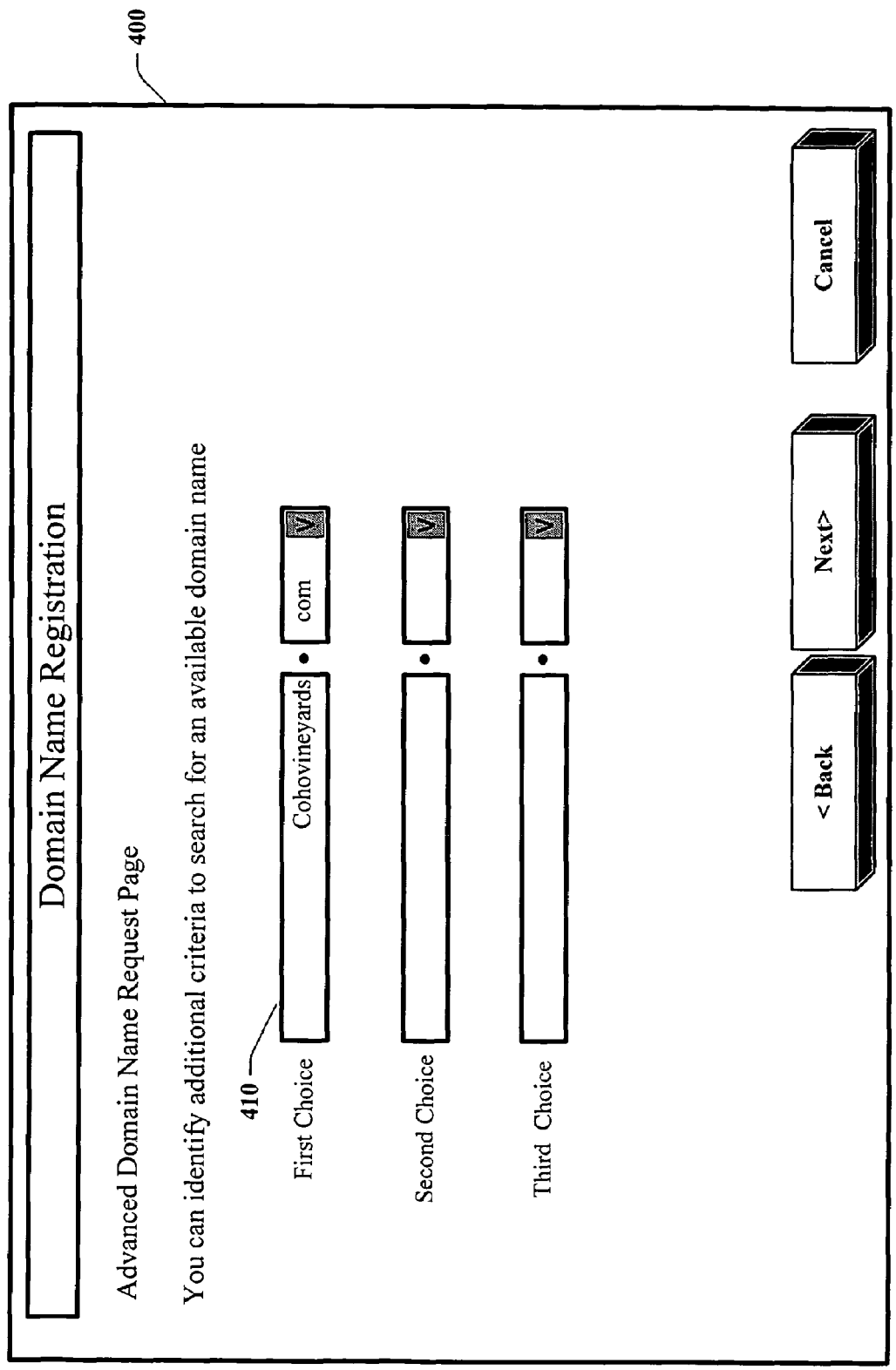
FIG. 4 illustrates another exemplary graphical uniform interface according to an aspect of the subject invention.

FIG. 4 illustrates a graphical uniform interface 400 that provides for a registration of a domain name service. The user can enter the desired name as a first choice at 410. If a desired domain name is not available, the schema of the subject invention can provide the registrar with hints for suggesting additional names that are available for purchase. The hints can include clues relating to the nature of the business, trademark, location of the business and the like.

Figure 5:
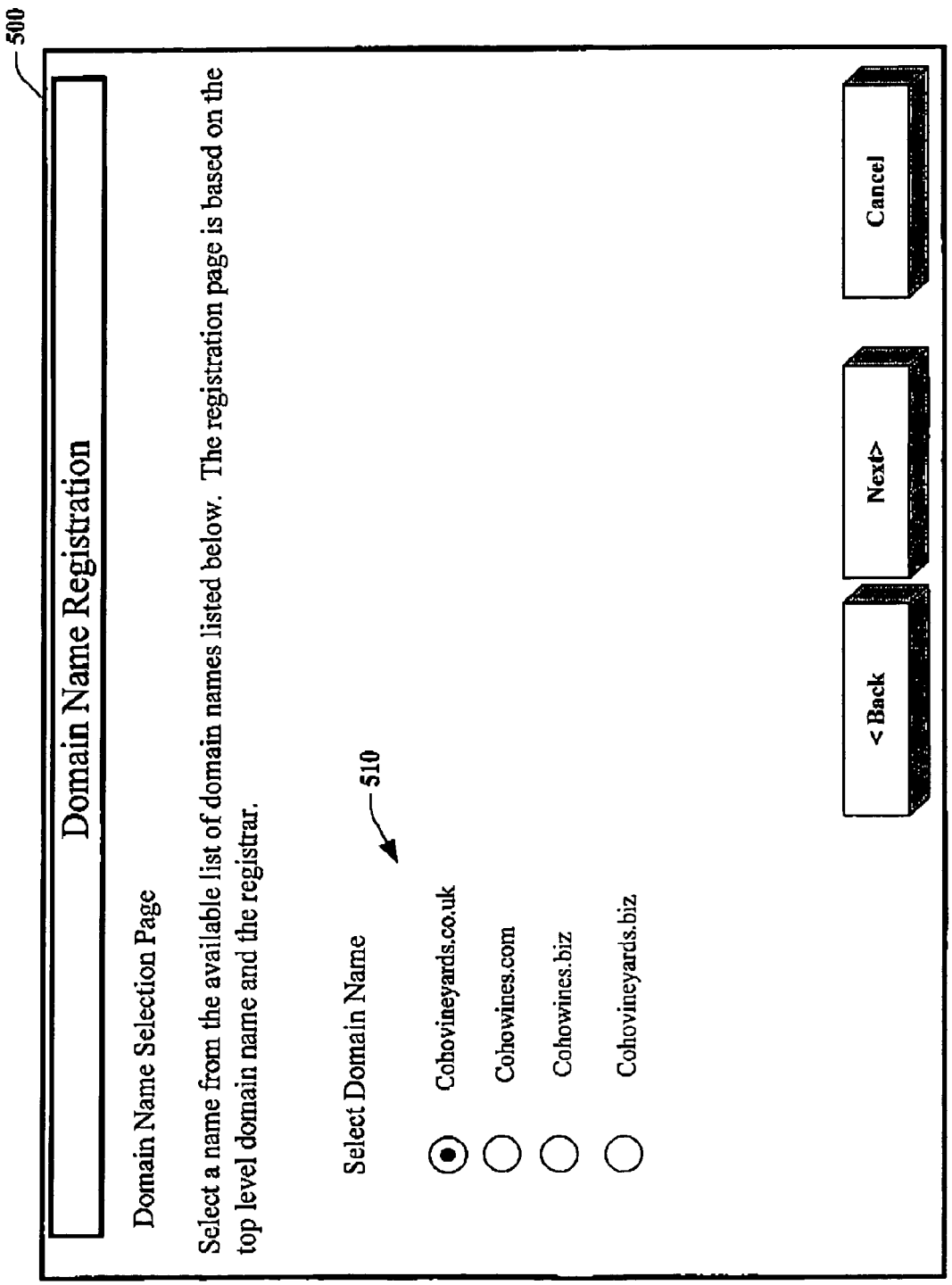
FIG. 5 illustrates yet another exemplary graphical uniform interface for a domain name selection page according to an aspect of the subject invention.

FIG. 5 illustrates an exemplary graphical uniform interface 500 employed for presentation of various domain names offered by a domain name registrar when it has been determined that the domain name "cohovineyards.com" is not available. Instead, the graphical interface 500 displays returned results, as illustrated in section 510, and can provide a user with a uniform selection tool for choosing other names, to initiate internet presence. As such, the exemplary user interface (GUI) 500 of the subject invention can suggest additional names that are available for purchase. Such suggested names can be complied based on hints provided by the schema of the subject invention. For example, such hints can include clues relating to the nature of the business, trademark, location of the business and the like. Accordingly, the registrar is prompted to suggest additional domain names for display to a user. Thus, the schema of the present invention can provide a user with a uniform presentation of various domains names and respective plans offered by the plurality of the domain name registrars, wherein the user can then select a desired plan therefrom, and purchase a domain name.

An exemplary schema that can define an expression of shared vocabulary between the end user machine and the domain name registrar is presented at the end of this document, as part of appendix A. Such exemplary schema can for example be in the form of an Extensible Markup Language (XML) that can define and describe a class of XML documents using schema constructs of an XML schema language. These schema constructs can be used to constrain and document the meaning, usage, and relationships of data types, elements and their content, attributes and their values, entities and their contents, and notations, as used in XML documents. Thus, in general, any computer system that can access an XML schema can process XML documents in accordance with the XML schema. Furthermore, typically any computer system that can access an XML schema can compose or modify XML documents for use by other computer systems that can also access the XML schema. A schema can be utilized to define virtually any data type, including logical, binary, octal, decimal, hexadecimal, integer, floating-point, character, character string, user-defined data types, and combinations of these data types used to defined data structures. XML elements and attributes can be defined to represent data types that are defined by a schema.

Figure 6:
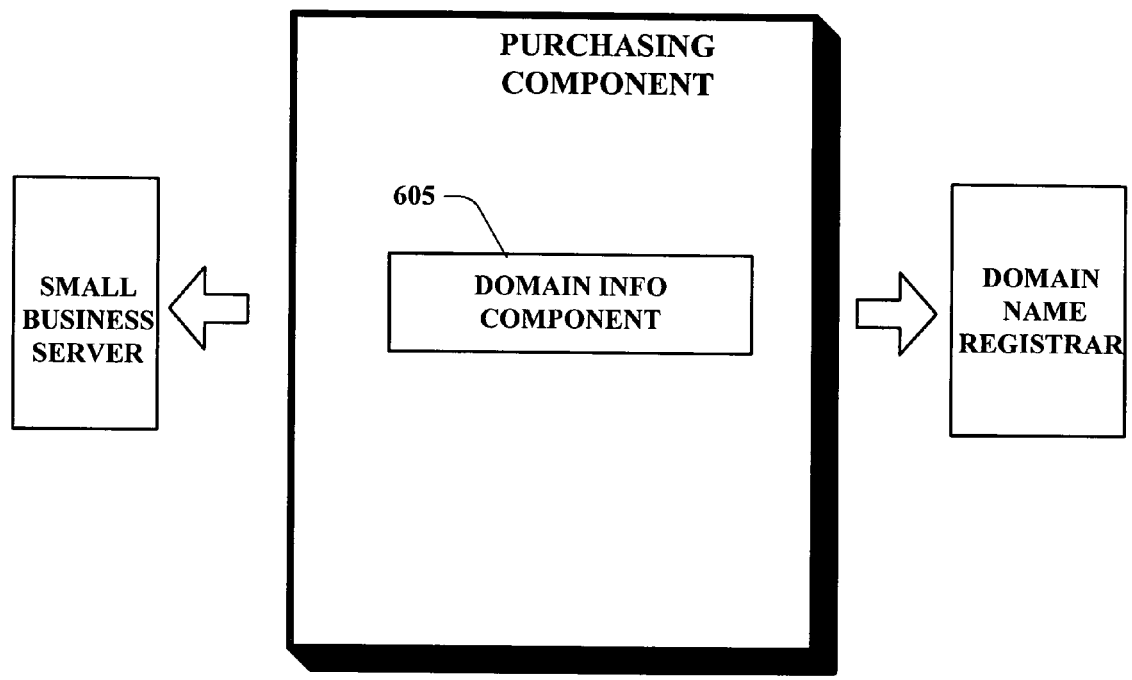
FIG. 6 illustrates a domain info component as part of the standardized messaging schema of the subject invention.

In a related aspect of the subject invention, the purchasing component can further include a "domain info" component 605 as illustrated in FIG. 6 that provides a list of contact information to the domain name registrar. Such list can include, for example, administrative contact, technical contact, contact in case of host server failure, and the like. Also, additional fields can be defined in the schema of the subject invention for authorization for a transfer of a domain name to another party.

Figure 7:
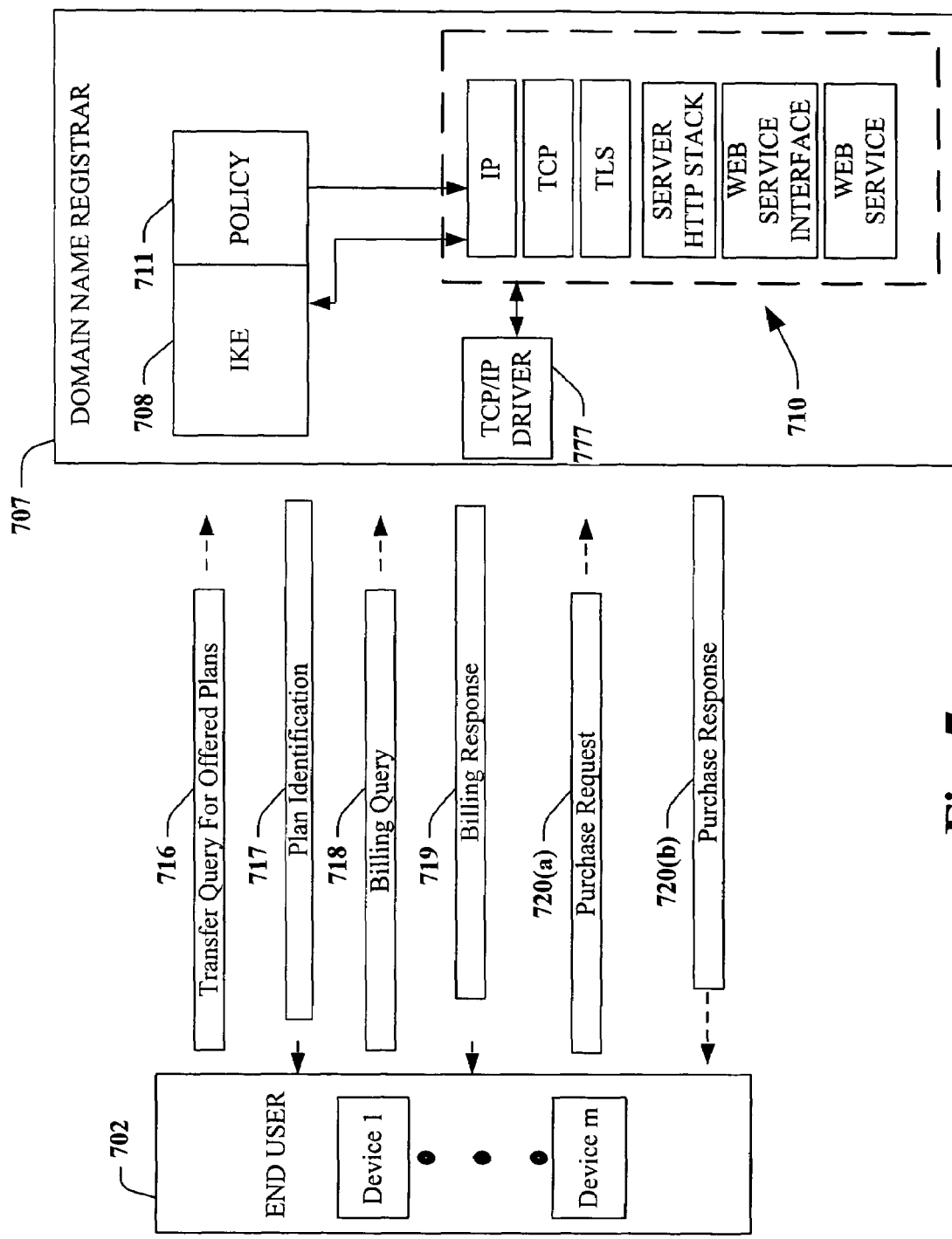
FIG. 7 illustrates a sequence of query steps performed between the end user machine and the domain name registrar in accordance with an aspect of the subject invention.

FIG. 7 illustrates a sequence of query steps between end user machines 702 (1 thru m, m being an integer) and a domain name registrar 707. The domain name registrar 707 can include a service side secure network stack 710 that further includes an IP layer implementation, a service side TCP layer implementation, a service side TLS, an HTTP stack implementation, a web service provider interface and a web service. The domain name registrar 707 can include an Internet Key Exchange (IKE) subsystem 708 for securing network traffic between the domain name registrar 707 and the end user devices 702. The domain name registrar 707 can also include policy modules 711 to enable configuration of the IKE subsystems 708. The policy module 711 can also provide security configuration information to the secure network stack 710 which communicate via TCP/IP driver 777 thereby enabling secure network traffic between the domain name registrar 707 and the end user machines 702.

The domain name registrar 707 can enlist and receive the standardized set of messages for purchase of a domain name (s) by a user. For example, at 716 the purchasing component of the standardized schema of the subject invention can query the domain name registrar(s), which are enlisted for receiving the standardized messages for a purchase query of the various plan offerings. Next, and at 717 a purchase query response identifying the various plans and terms of the service is communicated via the standardized set of messages of the subject invention back to the end user machine 702. Subsequently and at 718, a billing query is transferred to the domain name registrar 707. A response can then be prepared and sent back to the end user machine at 719 regarding various billing requirements for purchase of a domain name. The received response can then be displayed to a user, via a uniform presentation such that a user enjoys a similar experience, regardless of which domain name registrar the user interacts with. The user can then select a desired plan for purchase of a domain name, with a purchase request response pair 720(*a*) & 720(*b*) exchanged between the domain name registrar 707 and the end user machine(s) 702.

Similarly, an exemplary sequence for mapping the purchased domain name to point to a DNS provider, for a user's designated machines or IP addresses can be implemented. As such, a mapping request (not shown) can be sent to the domain name registrar 707, with a mapping response generated by the domain name registrar. Typically the mapping component can supply a pointer to a DNS provider designated by the user. The DNS provider can in turn function as a distributed data base that maps between human readable host names and IP addresses as well as mail routing information. As such, a DNS name space can be hierarchically organized, so that sub-domains can be locally administered, wherein for any group of computers partaking of the DNS naming scheme there can be a single definitive list of DNS names and associated IP addresses. The group of computers included in such list is called a zone. A zone could be a top level national domain, a business and the like. Within a zone, DNS service for subsidiary zones can be delegated along with a subsidiary domain, and the computer that maintains the master list for a zone is said to have authority for that zone, e.g., will be the primary name server for that zone. There will also be secondaries for that zone. When any process needs to determine an IP address given a DNS address it calls upon the local host to resolve the address. Such can be performed in a variety of ways.

For example, when a client searching for a business related to the end user of the subject invention enters a designated domain name (e.g., enduserbusiness.com), which is being hosted by a designated DNS provider and mapped thereto via the mapping component of the subject invention, a local server associated with the client is queried for such name. If such server does not know about such domain name, it will then ask the root server. The root server can then refer such query to the ".com" server, which in turn refers to the enduserbusinnes.com, which responds with an address. An exemplary XML schema for the mapping component that maps to a DNS provider, (as well as for the purchasing component described supra) is presented as part of appendix A—infra.

Figure 8:
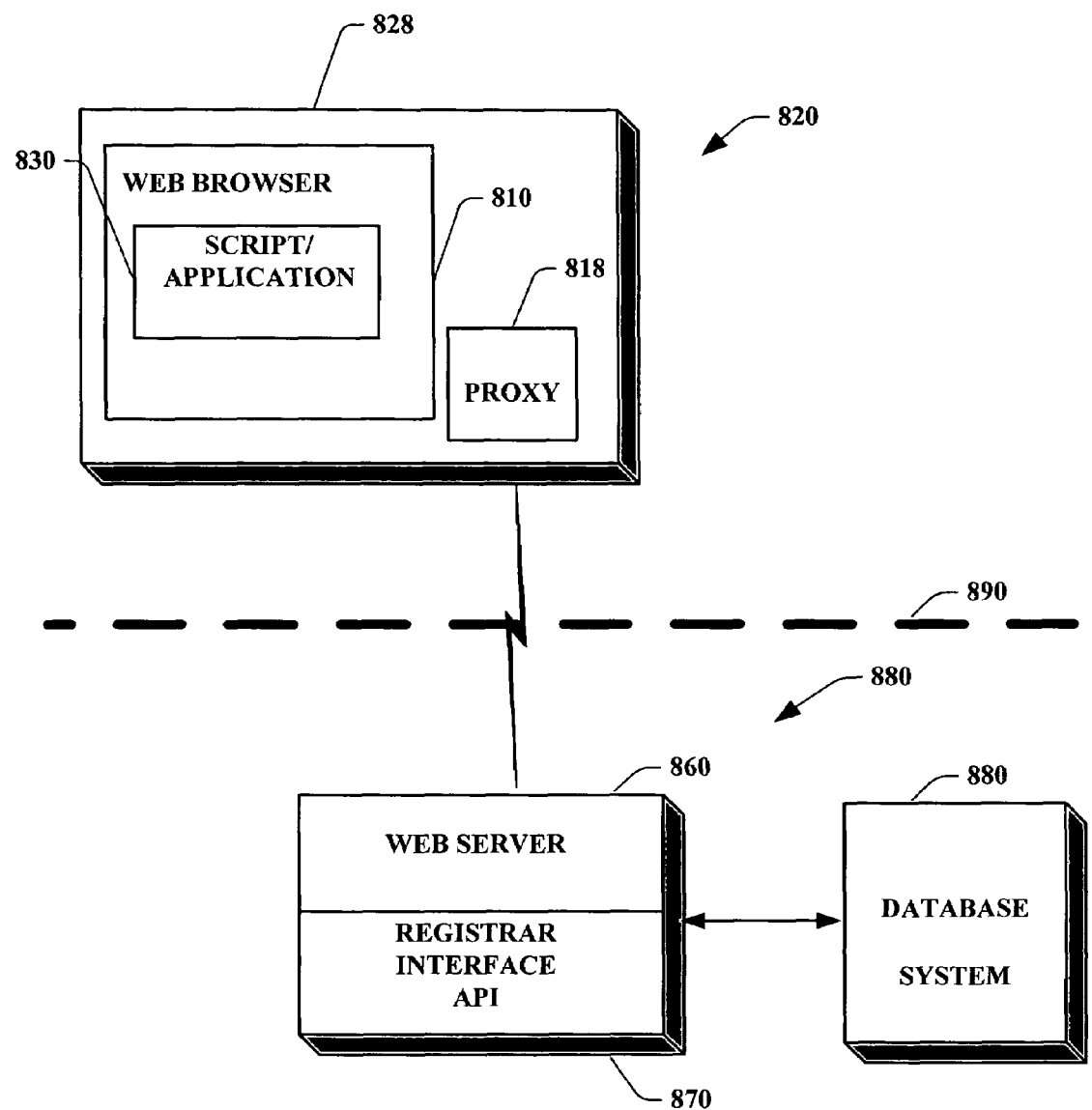
FIG. 8 illustrates an end user device that connects to a domain name registrar in accordance with an aspect of the subject invention.

FIG. 8 illustrates an end user device that connects to the domain name registrar in accordance with an aspect of the subject invention, wherein running on the end user side 820 can be a client process, for example, a web browser 810. Likewise, running on the domain name registrar side 880 can be a corresponding server process, for example, a web server 860. In addition, embedded in the Web Browser 810 can be a script or application 830, and running within the run-time environment 828 of the end user device 820, can exist a proxy 818 for packaging and unpacking data packets formatted in accordance with the standardized messages of the subject invention. Communicating with the domain name registrar can be a database management system (DBMS) 880, which manages access to a Content database of domain names. The DBMS 880 and the database (not shown) can be located in the registrar itself, or can be located remotely on a remote database server (not shown). Running on the Web server 860 can be a DNS interface Applications Programming Interface (API) 870, which provides access to the DBMS 880. The end user device 820 and the registrar side 880 can communicate with each other through a network 890, (e.g., the internet). When the client process, e.g., the Web browser 810, requests a query of service plans from the domain name registrar, the script or application 830 can issue a query, which is sent across the network (e.g., internet) 890 to registrar side 880, where it is interpreted, e.g., the Web server 860. The end users side 820 request to the registrar side 880 can contain multiple commands, and a response from the domain name registrar can return a plurality of service plan options. The received response can then be displayed to a user, via a uniform presentation such that a user enjoys a similar experience, regardless of which domain name registrar the user interacts with. The invention thus facilitates initial server configurations (e.g., presence of small businesses on the internet), and on-going maintenance, wherein employing multi vendor components are simplified by using a unified and common message structure.

Figure 9:
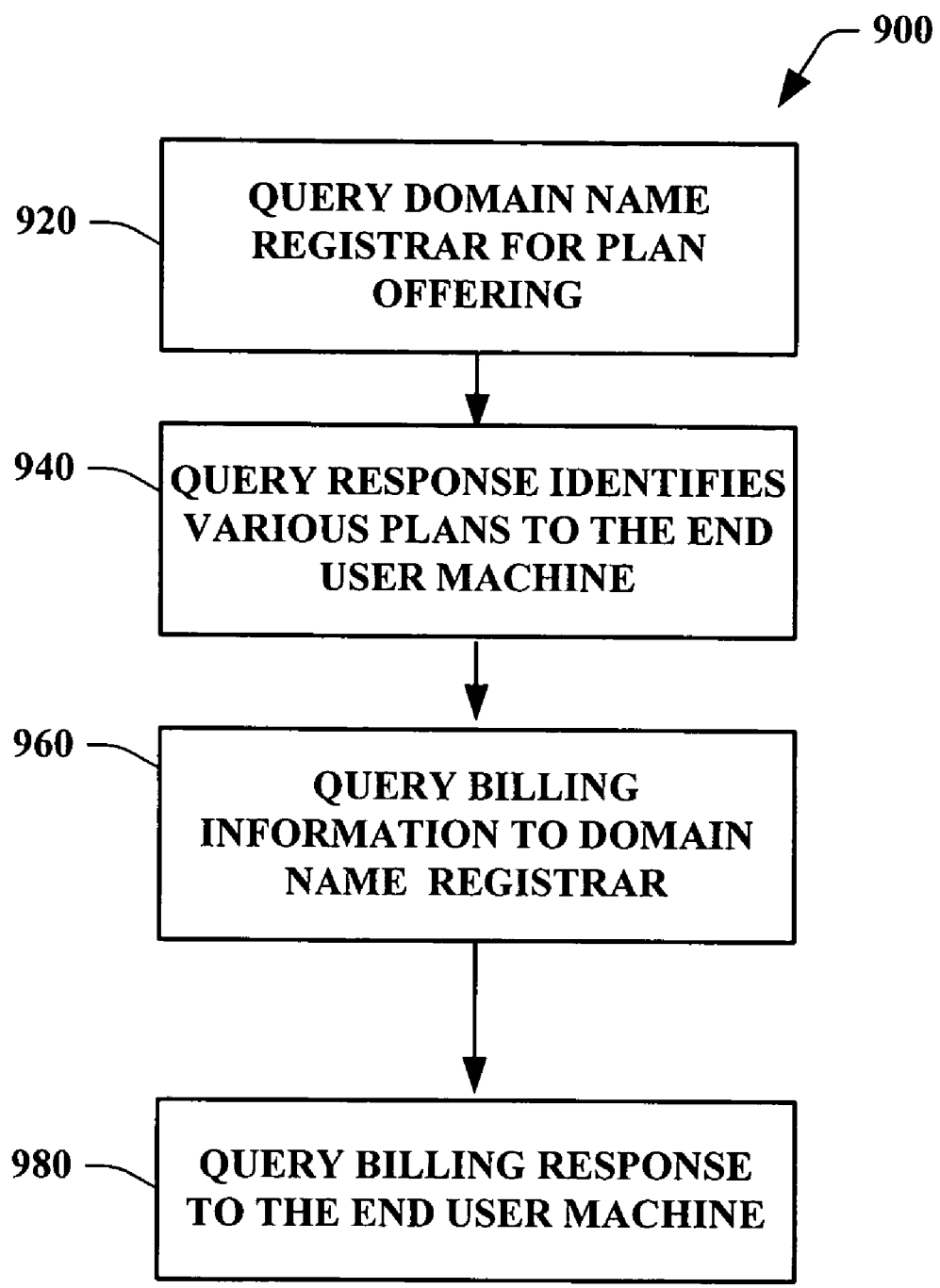
FIG. 9 illustrates a methodology of interacting with a domain name registrar that is enlisted to receive the standardized set of messages in accordance with an aspect of the subject invention.

FIG. 9 illustrates a methodology of hosting a domain name with a domain name registrar enlisted to receive standardized set of messages in accordance with an aspect of the subject invention. Initially, and at 920 the purchasing component, as part of the standardized message schema of the subject invention, can query the domain name registrar(s) regarding the various plan offerings. In response to such query, and at 940 a purchase query response (e.g., data packets) identifying the various plans and terms of the service is communicated via the standardized set of messages of the subject invention back to the end user machine. Subsequently and at 960, a billing query is transferred to the domain name registrar. A response can then be prepared and sent back to the end user machine regarding various billing requirements for purchasing/transferring the domain name, at 980. The received response can then be displayed to a user, via a uniform presentation as discussed supra, such that a user enjoys a similar experience, regardless of which domain name registrar the user interacts with. The user can then select a desired plan for purchase, and initiate presence of its domain name on the web.

While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

Figure 10:
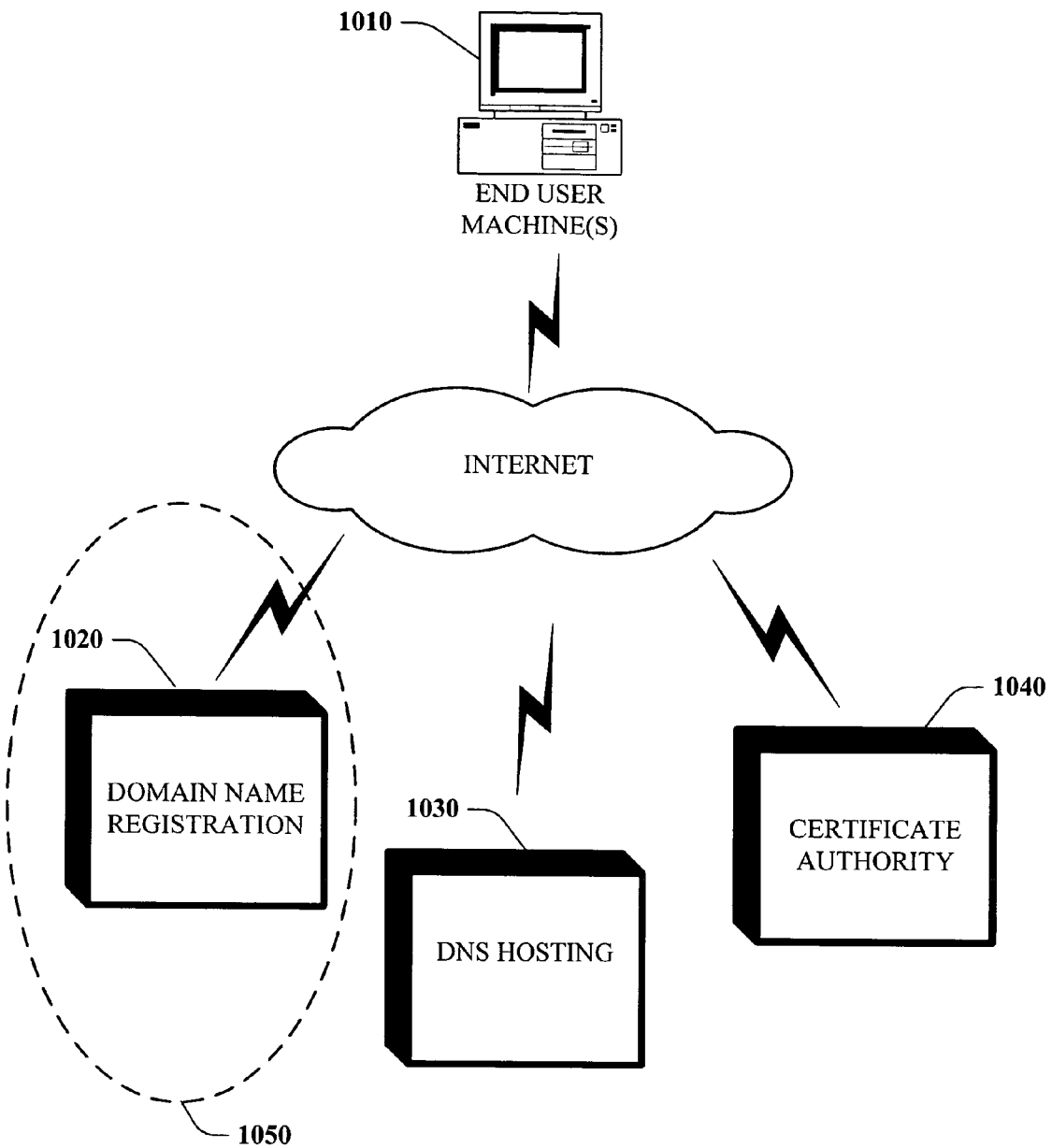
FIG. 10 illustrates a schematic diagram of providing an end user presence on the internet via employing a multi vendor component.

FIG. 10 illustrates a schematic diagram of providing an end user presence on the internet via employing a multi vendor component, wherein the subject invention primarily addresses the interaction 1050 between an end user machine, such as a machine 1010 (e.g., small business computer) and a registrar for domain name registration 1020. The end user machine 1010 can interact with a plurality of vendors 1020, 1030, and 1040 via the internet. Vendor 1020 can primarily supply the end user with a domain name such as "mybusiness.com.", and manages the various aspects of domain name registration, as illustrated by the interaction 1050. During the interaction 1050 a set of standardized messages, for example in the form of XML messages, are automatically exchanged between the end user machine and the domain name registrar. Such standard messages can provide a user with a uniform presentation of various plans offered by the plurality of the domain name registrars, wherein the user can then select a desired plan therefrom.

Upon obtaining such domain name, the end user can then seek and interact with various DNS providers 1030 for hosing such domain name. Similarly, vendor 1040 can manage certificate authority and authenticating technologies such as Secure Sockets Layer (SSL) encryption with the domain name web site to verify validity (e.g., the website is trusted). Such technologies can verify a web site via ensuring the website is associated with a valid (e.g., signed) web site certificate. Generally, the web site certificate can provide web site identification, such as the web site's publisher, and can be employed to match a web site publisher with the certificate. When a match is successful, the web client is typically provided access to the web site.

Figure 11:
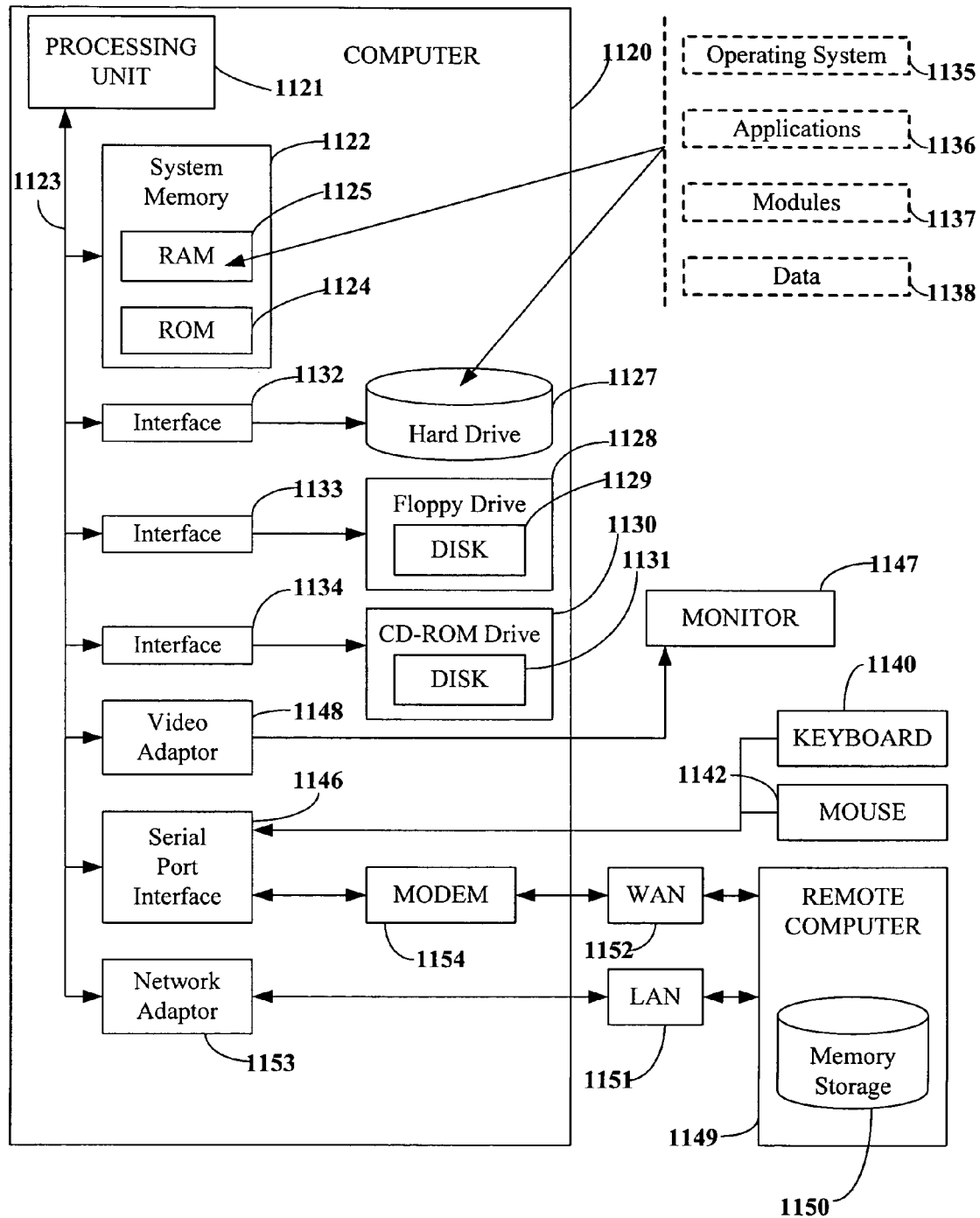
FIG. 11 is a schematic block diagram illustrating a suitable computing environment that can employ various aspects of the subject invention.

Referring now to FIG. 11, a brief, general description of a suitable computing environment on the client as well as the server side is illustrated wherein the various aspects of the subject invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary environment includes a computer 1120, including a processing unit 1121, a system memory 1122, and a system bus 1123 that couples various system components including the system memory to the processing unit 1121. The processing unit 1121 can be any of various commercially available processors. Dual microprocessors and other multi-processor architectures also can be used as the processing unit 1121.

The system bus can be any of several types of bus structure including a memory bus or memory controller, a peripheral bus, and a local bus using any of a variety of commercially available bus architectures. The system memory may include read only memory (ROM) 1124 and random access memory (RAM) 1125. A basic input/output system (BIOS), containing the basic routines that help to transfer information between elements within the computer 1120, such as during start-up, is stored in ROM 1124.

The computer 1120 further includes a hard disk drive 1127, a magnetic disk drive 1128, e.g., to read from or write to a removable disk 1129, and an optical disk drive 1130, e.g., for reading from or writing to a CD-ROM disk 1131 or to read from or write to other optical media. The hard disk drive 1127, magnetic disk drive 1128, and optical disk drive 1130 are connected to the system bus 1123 by a hard disk drive interface 1132, a magnetic disk drive interface 1133, and an optical drive interface 1134, respectively. The drives and their associated computer-readable media provide nonvolatile storage of data, data structures, computer-executable instructions, etc. for the computer 1120. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 1125, including an operating system 1135, one or more application programs 1136, other program modules 1137, and program data 1138. The operating system 1135 in the illustrated computer can be substantially any commercially available operating system.

A user can enter commands and information into the computer 1120 through a keyboard 1140 and a pointing device, such as a mouse 1142. Other input devices (not shown) can include a microphone, a joystick, a game pad, a satellite dish, a scanner, or the like. These and other input devices are often connected to the processing unit 1121 through a serial port interface 1146 that is coupled to the system bus, but may be connected by other interfaces, such as a parallel port, a game port or a universal serial bus (USB). A monitor 1147 or other type of display device is also connected to the system bus 1123 via an interface, such as a video adapter 1148. In addition to the monitor, computers typically include other peripheral output devices (not shown), such as speakers and printers.

The computer 1120 can operate in a networked environment using logical connections to one or more remote computers, such as a remote computer 1149. The remote computer 1149 may be a workstation, a server computer, a router, a peer device or other common network node, and typically includes many or all of the elements described relative to the computer 1120, although only a memory storage device 1150 is illustrated in FIG. 11. The logical connections depicted in FIG. 11 may include a local area network (LAN) 1151 and a wide area network (WAN) 1152. Such networking environments are commonplace in offices, enterprise-wide computer networks, Intranets and the Internet.

When employed in a LAN networking environment, the computer 1120 can be connected to the local network 1151 through a network interface or adapter 1153. When utilized in a WAN networking environment, the computer 1120 generally can include a modem 1154, and/or is connected to a communications server on the LAN, and/or has other means for establishing communications over the wide area network 1152, such as the Internet. The modem 1154, which can be internal or external, can be connected to the system bus 1123 via the serial port interface 1146. In a networked environment, program modules depicted relative to the computer 1120, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 1120, unless otherwise indicated. Such acts and operations are sometimes referred to as being computer-executed. It will be appreciated that the acts and symbolically represented operations include the manipulation by the processing unit 1121 of electrical signals representing data bits which causes a resulting transformation or reduction of the electrical signal representation, and the maintenance of data bits at memory locations in the memory system (including the system memory 1122, hard drive 1127, floppy disks 1128, and CD-ROM 1131) to thereby reconfigure or otherwise alter the computer system's operation, as well as other processing of signals. The memory locations wherein such data bits are maintained are physical locations that have particular electrical, magnetic, or optical properties corresponding to the data bits.

Figure 12:
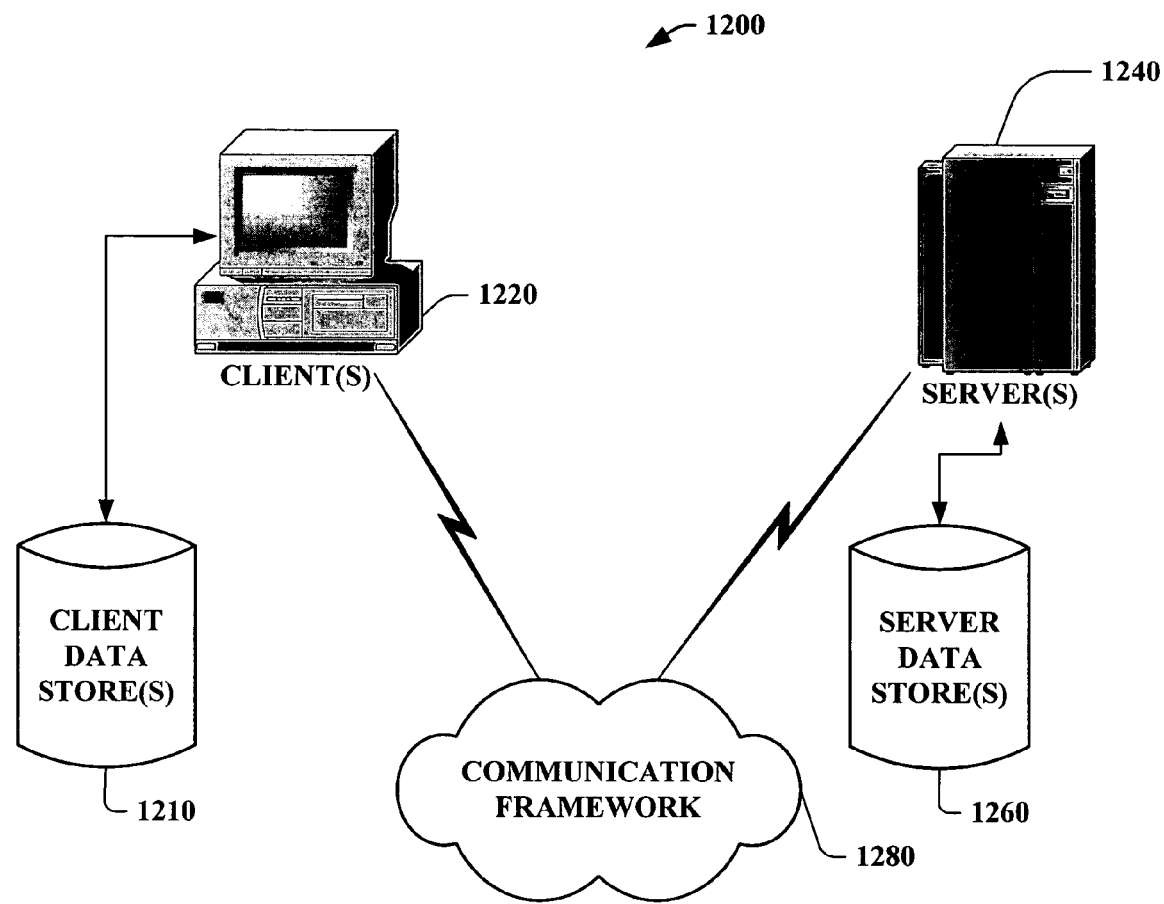
FIG. 12 illustrates a client-domain name registrar that can employ a messaging schema according to one aspect of the subject invention.

Referring now to FIG. 12, a client-domain name registrar system 1200 that employs a standardized schema according to one aspect of the subject invention is illustrated. The client(s) 1220 can be hardware and/or software (e.g., threads, processes, computing devices). The system 1200 also includes one or more server(s) 1240. The server(s) 1240 can also be hardware and/or software (e.g., threads, processes, computing devices). For example, such servers 1240 can house threads to perform transformations by employing the subject invention. The client 1220 and the server 1240 can communicate, in the form of data packets transmitted according to the subject invention, between two or more computer processes. The client/server can also share the same process. As illustrated, the system 1200 includes a communication framework 1240 that can facilitate communications between the client(s) 1220 and the server(s) 1240. The client(s) 1220 is operationally connected to one or more client data store(s) 1210 that can store information local to the client(s) 1220. Moreover, client 1220 can access and update databases 1260 located on a server computer 1240 running a server process. In one aspect of the subject invention, the communication frame work 1240 can be the internet, with the client process being a Web browser and the server process being a Web server. As such, a typical client 1220 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 1240 can be university or corporate mainframe computers, or dedicated workstations, and the like.

A sample XML schema that provides an example for the various components according to the subject invention is provided infra, as part of appendix A, and this appendix is to be considered part of this specification describing the invention.

Figure 13:
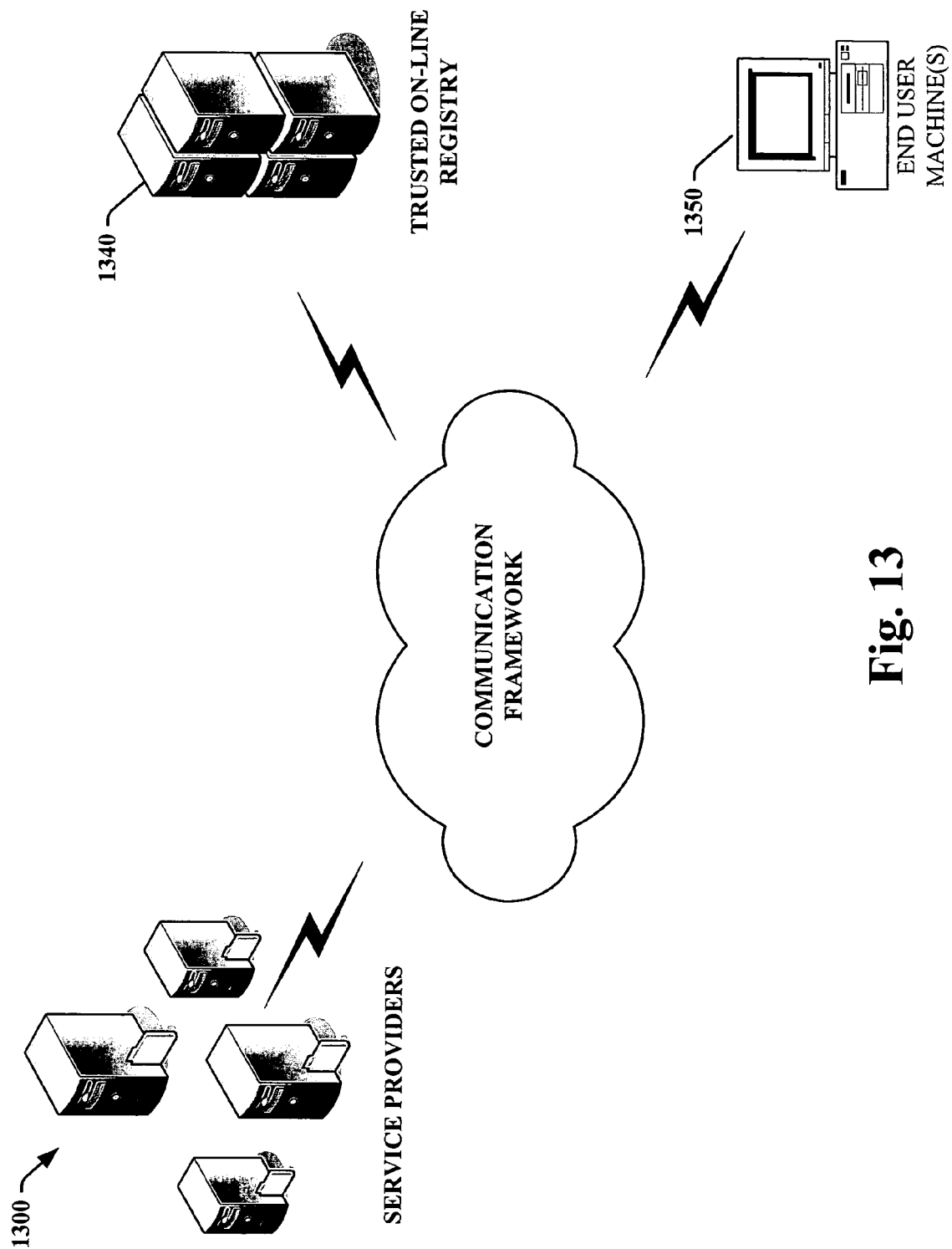
FIG. 13 illustrates an interaction among service providers, a trusted on line registry, and user machine(s), in accordance with an aspect of the subject invention.

Moreover, although the invention has been shown and described with respect to certain illustrated aspects, it will be appreciated that equivalent alterations and modifications will occur to others skilled in the art upon the reading and understanding of this specification and the annexed drawings. For example, referring to FIG. 13 systems and methods can be implemented based on web services that automatically and securely display customized lists of service providers 1300 based on user 1350 preferences or needs, from a trusted on-line registry 1340. Such can mitigate the requirement for users 1350 to visit or browse sites to locate service providers 1300. Put differently, web services based system and method implemented according to the subject invention can allow the user 1350 to automatically and securely get a list of providers 1300 based on their needs and preferences.

Typically, there can exist two major components for such systems. For example, first there can be an on premise device (client), and second there can be hosted directory of services in the Internet (service). The on-premise device can in general be able to establish a trusted connection between itself and the on-line directory associated with the trusted on-line registry 1340. Services on the hosted directory could be categorized by multiple criteria such as service type, location of the provider, language or industry vertical. Additionally, the hosted directory can also have a profile of each on-site entity (person or business). This profile can include optional parameters, such as; the description of the entity and their preferences.

Moreover, these entities could optionally elect to sign up for subscription such that when either any service or a service of interest is listed for the first time it is automatically published to the client device. Additionally, the hosted directory can allow service providers to create a profile and dynamically update that information via web services. Specific to on-line Information Systems and Electronic Business related services, the on-premise client can also automatically configure the system for the user.

Examples of applications for the above can include, but are not limited to: listing providers for Domain Name Management, Dynamic DNS, trusted SSL certificates, and the like. In particular, in the case of the domain name purchases, once the user decides on which domain name to purchase, the client (e.g., a Small Business Server-SBS) 1350 can query the hosted directory of services to get the list of providers 1300 that support the top level domain (TLD) specified by the user. Such query, for example can contain data about the location and the language of the SBS to hint the registry to come up with the list of providers available for the specified location and language. An example for the format of such query can be as follows:

Top Level Domain(s) (TLDs)

| Location | ISO 3166 based country code |
|---|---|
| Language | RFC 1766 based language identifier |

Upon receiving such a query, the registry can also return the sorted list of providers available in the following format:

Provider Name

Provider Description URL

Service URL

As the user selects a provider from this list, SBS will communicate with the provider through the associated service URL for the rest of the domain purchase process.

Also, regarding the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

Furthermore, to the extent that the terms "includes", "including", "has", "having", and variants thereof are used in either the detailed description or the claims, these terms are intended to be inclusive in a manner similar to the term "comprising."

What is claimed is:

1. A system that facilitates standardized interaction between a user and one or more of a plurality of domain name registrars, comprising:

one or more processors that execute the following computer executable components stored on a computer readable medium:

a subscription component that automatically publishes to a client device when a service of interest is listed or when any service is listed for the first time;

a purchasing component that uses a standardized message schema, wherein the schema operates between an end user machine and a domain name registrar, and wherein the schema is exchanged between the domain name registrar and a user machine, wherein the purchasing component:

automatically queries at a domain name registrars using a the standardized message schema, to offer at least one plan for sale of a domain name, using one or more standardized messages of the standardized message schema that have the same structure for defining details of the at least one plan for sale of a domain name, independent of the domain name registrar queried, wherein the at least one plan contains terms of sale organized according the standardized schema, characterizes the terms of sale of the at least one plan according to the standardized schema, and displays the characterized terms of sale of the at least one plan using a standardized presentation format independent of the domain name registrar, by interpreting the terms of the sale according to the standardized schema; and a mapping component that, as part of the standardized message schema exchanged between the domain name registrar and the user machine, maps the domain name to a Domain Name Service (DNS) provider designated to manage inbound traffic to the domain name.

2. The system of claim 1, the messaging component queries a plurality of domain name registrars for a plurality of plans and displays the plurality of plans with a uniform format independent of the domain name registrars.

3. The system of claim 1, the terms of sale include at least one of a plan selection, a renewal option, a promotional call, a transfer option from business to business, an identification of a top level domain name or a billing plan.

4. The system of claim 1, the mapping component supplies a pointer mechanism that points to the DNS provider.

5. The system of claim 1, further comprising a domain information component that provides a list of contact information to the domain name registrar.

6. The system of claim 5, the list of contact information comprises at least one of a technical contact, an administrative contact, or a contact in case of host server failure.

7. A non-transitory computer-readable storage medium having stored thereon a data structure, comprising:
- a first computer executable component that implements a subscription component that automatically publishes to a client device when a service of interest is listed or when any service is listed for the first time
- a second computer executable component that implements a purchasing component that uses a standardized message schema, wherein the schema operates between an end user machine and a domain name registrar, and wherein the schema is exchanged between domain name registrars in the plurality of domain name registrars and a computer of an end user, wherein the purchasing component:
  - automatically queries at a domain name registrars using a the standardized message schema, to offer at least one plan for sale of a domain name, using one or more standardized messages of the standardized message schema that have the same structure for defining details of the at least one plan for sale of a domain name, independent of the domain name registrar queried, wherein the at least one plan contains terms of sale organized according the standardized schema; and
  - characterizes the terms of sale of the at least one plan according to the standardized schema, the characterization of the service agreement to purchase a domain name being structured the same, independent of the domain name registrar selected by being structured according to the standardizes message schema, and presents the characterized service agreement at the computer via a uniform format according to the standardized message schema that is consistent between domain name registrars irrespective of the domain name registrar used; and
- a third computer executable component that implements a mapping component that as part of the standardized message schema exchanged between the domain name registrar and the user machine maps the domain name to a DNS provider designated to manage inbound traffic to the domain name.

8. The computer-readable medium of claim 7, the first computer executable component further comprises a domain information component that provides a list of contacts to the domain name registrar.

9. The computer-readable medium of claim 7, the designated DNS provider identifies an IP address of the computer.

10. The computer readable medium of claim 7, the first computer executable component provides for a transfer of the domain name.

11. The system of claim 1, the terms of sale include availability of the domain name.

12. The system of claim 11, the purchasing component provides hints for suggesting additional domain names available for purchase.

13. The system of claim 12, the hints relate to at least one of a trademark, a location or a nature of a business.

14. The system of claim 1, the purchasing component displays additional domain names available for purchase.

15. The system of claim 8, the list of contacts includes at least one of an administrative contact, a technical contact or a contact in case of host server failure.

16. The system of claim 7, the service agreement includes at least one of an availability of the domain name, whether a transfer of the domain name is required, an identification of a top level domain name, renewal options, or promotional calls.

17. The system of claim 7, the first computer executable component provides the domain name registrar with hints for suggesting additional names that are available for purchase.

18. The system of claim 17, the hints relate to at least one of a business nature, a trademark or a location.

19. The system of claim 7, the first computer executable component suggests additional names available for purchase.

20. The system of claim 19, the first computer executable component provides a uniform presentation of the additional names available for purchase and corresponding purchase plans offered by a plurality of domain name registrars.

* * * * *

UNITED STATES PATENT AND TRADEMARK OFFICE
CERTIFICATE OF CORRECTION

| | | |
|---|---|---|
| PATENT NO. | : 7,743,093 B2 | Page 1 of 1 |
| APPLICATION NO. | : 10/985177 | |
| DATED | : June 22, 2010 | |
| INVENTOR(S) | : Kevin T. Damour et al. | |

It is certified that error appears in the above-identified patent and that said Letters Patent is hereby corrected as shown below:

In column 14, line 40, in Claim 1, delete "a the" and insert -- the --, therefor.

In column 15, line 26, in Claim 7, delete "a the" and insert -- the --, therefor.

In column 16, line 13, in Claim 10, delete "computer readable" and insert -- computer-readable --, therefor.

Signed and Sealed this
First Day of February, 2011

David J. Kappos
*Director of the United States Patent and Trademark Office*